(12) United States Patent
Schwab et al.

(10) Patent No.: US 9,083,788 B1
(45) Date of Patent: Jul. 14, 2015

(54) PORTABLE COMMUNICATIONS DEVICE

(75) Inventors: Barry H. Schwab, West Bloomfield, MI (US); John G. Posa, Ann Arbor, MI (US)

(73) Assignee: S.F. IP PROPERTIES 21 LLC, Wilmington, DE (US)

( * ) Notice: Subject to any disclaimer, the term of this patent is extended or adjusted under 35 U.S.C. 154(b) by 2269 days.

(21) Appl. No.: 09/900,827

(22) Filed: Jul. 6, 2001

Related U.S. Application Data

(60) Provisional application No. 60/219,381, filed on Jul. 19, 2000.

(51) Int. Cl.
- *H04B 1/38* (2006.01)
- *H04M 1/27* (2006.01)
- *H04M 1/2745* (2006.01)

(52) U.S. Cl.
CPC ........ *H04M 1/271* (2013.01); *H04M 1/274558* (2013.01)

(58) Field of Classification Search
CPC .......... H04M 1/271; H04M 1/274575; H04M 1/274558
USPC .............. 455/567, 569.1, 418, 460, 564, 565, 455/575.7, 563
See application file for complete search history.

(56) References Cited

U.S. PATENT DOCUMENTS

| | | | |
|---|---|---|---|
| 4,838,796 A | | 6/1989 | Gozdowiak |
| 5,075,894 A | * | 12/1991 | Iwase et al. ...................... 379/69 |
| 5,157,783 A | | 10/1992 | Anderson et al. |
| 5,277,429 A | | 1/1994 | Smith, III |
| 5,437,552 A | | 8/1995 | Baer et al. |
| 5,534,888 A | | 7/1996 | Lebby |
| 5,636,267 A | * | 6/1997 | Utsumi et al. ............. 379/88.01 |
| 5,713,741 A | | 2/1998 | DeMars |
| 5,774,109 A | | 6/1998 | Winskey et al. |
| 5,788,507 A | | 8/1998 | Redford et al. |
| 5,796,816 A | * | 8/1998 | Utsumi ......................... 379/381 |

(Continued)

OTHER PUBLICATIONS

Office Action dated Apr. 14, 2011 for U.S. Appl. No. 12/388,267.

(Continued)

*Primary Examiner* — Wesley Kim
*Assistant Examiner* — Richard Chan
(74) *Attorney, Agent, or Firm* — Brundidge & Stanger, P.C.

(57) ABSTRACT

Improvements enhance the use of portable communications devices such as cellular telephones. According to one embodiment, data storage capacity is added to the device, such that if a "speed-dial" type operation is initiated, the device is operative to announce a pre-recorded message previously associated by the user with that key sequence, such as the number and/or person being dialed. Another feature enables the user to program a series of telephone numbers before in advance. In this way, the user is able to initiate the dialing of the numbers sequentially, without having to select or key in information for each call while driving. Yet another aspect of the invention offers the ability to interact with GPS ("Global Positioning Satellite") information. In some scenarios, it may be advantageous to be able to switch the communications link (say, between different carrier services, such as "Air-Touch Cellular" or "Sprint PCS") as the communications device is moved to different locations. Alternatively, the ability to identify its own location enables the device to respond to inquiries from an external stimulus source, by which the location of the device is transmitted back to the external source.

53 Claims, 1 Drawing Sheet

(56) References Cited

U.S. PATENT DOCUMENTS

| | | | |
|---|---|---|---|
| 5,991,594 A | 11/1999 | Froemer | |
| 6,041,300 A * | 3/2000 | Ittycheriah et al. | 704/255 |
| 6,081,730 A * | 6/2000 | Lieben et al. | 455/557 |
| 6,148,173 A | 11/2000 | Bell | |
| 6,157,621 A * | 12/2000 | Brown et al. | 370/310 |
| 6,157,844 A | 12/2000 | Doran et al. | |
| 6,240,168 B1 | 5/2001 | Stanford et al. | |
| 6,512,749 B1 | 1/2003 | Wright et al. | |
| 6,597,669 B1 | 7/2003 | Takahashi et al. | |
| 6,721,577 B2 * | 4/2004 | Humes | 455/564 |
| 6,804,338 B1 * | 10/2004 | Chen | 379/142.08 |
| 7,304,635 B2 | 12/2007 | Seet et al. | |
| 2002/0191776 A1 * | 12/2002 | Khan | 379/266.07 |
| 2006/0168539 A1 * | 7/2006 | Hawkins et al. | 715/780 |
| 2009/0254826 A1 | 10/2009 | Schwab | |

OTHER PUBLICATIONS

Final Office Action dated Oct. 6, 2011 for U.S. Appl. No. 12/388,267.
Eric Cosatto & Hans Peter Graf, "Sample-Based Synthesis of Photo-Realistic Talking Heads", Jun. 8-10, 1998, Computer Animation 98. Proceedings, AT&T Labs.-Res., Red Bank, NJ, USA ; Graf, H.P.
"Non Final Office Action", U.S. Appl. No. 12/388,267, (Nov. 29, 2010), 7 pages.

* cited by examiner

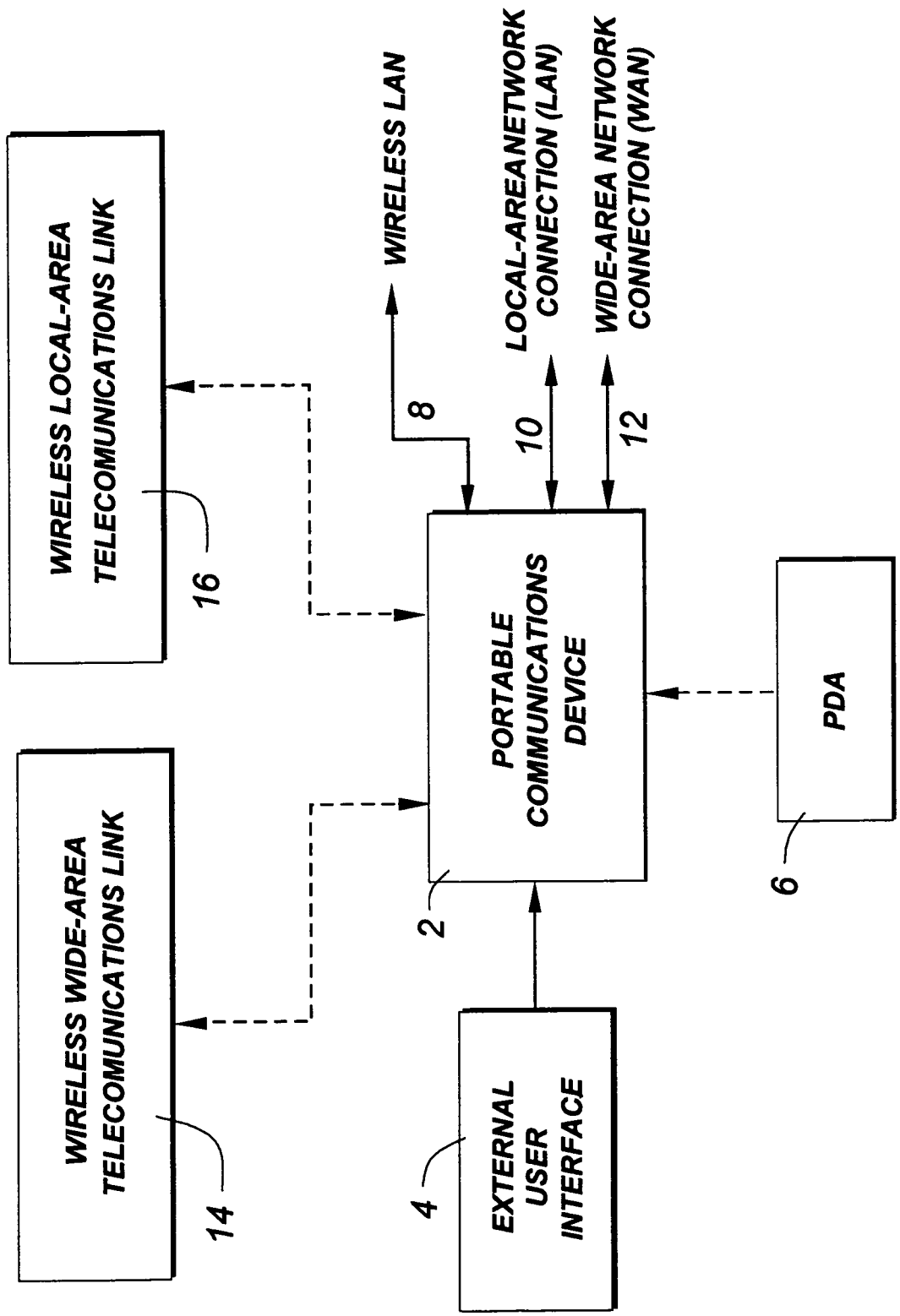

PORTABLE COMMUNICATIONS DEVICE

REFERENCE TO RELATED APPLICATION

This application claims priority from U.S. provisional application Ser. No. 60/219,381, filed Jul. 19, 2000, the entire contents of which is incorporated herein by reference.

FIELD OF THE INVENTION

This invention relates to portable communication devices, and, more particularly, to a personal communication device with enhanced hands-free operation capabilities.

BACKGROUND OF THE INVENTION

Consumers long since have become accustomed to the convenience of continuous, ubiquitous availability of communications links, and, as a result, have been hesitant to compromise their access to these types of connections, even when safety would be jeopardized. There are many devices available which provide "hands-free" operation, but they still require the user to perform a variety of activities, such as dialing a telephone number, which represent significant distractions if the user is attempting to drive a vehicle while operating the communication device.

SUMMARY OF THE INVENTION

Broadly, this invention provides certain improvements which enhance the use of portable communications devices such as cellular telephones. According to one embodiment, data storage capacity is added to the device, such that if a "speed-dial" type operation is initiated, the device is operative to announce a pre-recorded message previously associated by the user with that key sequence, such as the number and/or person being dialed.

Another feature enables the user to program a series of telephone numbers before in advance. In this way, the user is able to initiate the dialing of the numbers sequentially, without having to select or key in information for each call while driving.

Yet another aspect of the invention offers the ability to interact with GPS ("Global Positioning Satellite") information. In some scenarios, it may be advantageous to be able to switch the communications link (say, between different carrier services, such as "Air-Touch Cellular" or "Sprint PCS") as the communications device is moved to different locations. Alternatively, the ability to identify its own location enables the device to respond to inquiries from an external stimulus source, by which the location of the device is transmitted back to the external source.

BRIEF DESCRIPTION OF THE DRAWINGS

FIG. 1 depicts a preferred embodiment of the invention.

DETAILED DESCRIPTION OF THE INVENTION

The instant invention overcomes these obstacles with a variety of features directed towards minimizing the need for user intervention while operating the device. Using a portable telephone as an example of these types of devices, data storage capacity is added to go beyond the typical application of "remembering" the pre-assigned "speed-dial" numbers. If a "speed-dial" operation is initiated by pressing a particular sequence of key buttons, such as *23, then, in an enhanced unit constructed in accordance with the invention, this prompts the device to announce a pre-recorded message (previously associated by the user with that key sequence), such as "Twenty-three - - - John Smith, Office". In this way, the user is able to initiate the call without looking directly at the device keyboard. As an additional feature, the individual keys may be textured so as to allow distinguishing them from each other, using, for example, raised characters or Braille or other symbols.

Another feature enables the user to program a series of telephone numbers before in advance. In this way, the user is able to initiate the dialing of the numbers sequentially, without having to select or key in information for each call while driving. By selecting just a few control keys, it would be possible to skip a number which goes unanswered and return to it later, or delete a number from the sequence after the call has been completed. As an alternative to manual entry, a voice command such as "dial next number" may be used. Furthermore, as opposed to user entry of the numbers to be called, unanswered received calls may also be placed in the queue using caller-ID information. Selection of such a number to be called, or replay of a stored voice message, would preferably be annunciated prior to dialing.

Yet another aspect of the invention offers the ability to interact with GPS ("Global Positioning Satellite") information. In some scenarios, it may be advantageous to be able to switch the communications link (say, between different carrier services, such as "Air-Touch Cellular" or "Sprint PCS") as the communications device is moved to different locations. Alternatively, the ability to identify its own location enables the device to respond to inquiries from an external stimulus source, by which the location of the device is transmitted back to the external source.

FIG. 1 depicts the various configuration features of the invention in practice. The personal communications device 2 is equipped with a user interface, such as a keypad, and may be supplemented with an external user interface 4, such as a graphical interface, a wireless remote control, a "mouse", or another similar device. The personal communication device typically will include all of the features of a conventional cellular telephone, such as the ability to dial numbers from an internal memory, and automatically seeking a wide-area network connection to carry the conversation. In the implementation of the instant invention, these capabilities would be augmented with additional features, such as voice-synthesis circuitry, enhanced connection-seeking capabilities, and provisions for interfacing with external devices, such as a personal digital assistant (PDA) 6. The user would be able to program the PDA with a list of calls to be placed, and even may provide a schedule specifying when these calls would be initiated; this information then would be transferred to the personal communications device. The PDA may remain continuously attached to the personal communications device through a wired or wireless communication link, or it may download the call information in a single session, and the personal communications device then would complete the designated connections and any calls or tasks that have been specified in a schedule.

Additional facilities optionally may be provided for interconnecting the personal communications device to external devices. As examples, the personal communications device may employ a wireless connection to a local area network (LAN) 8, a direct wired connection to a LAN 10, or a wireless or wired connection to a wide area network (WAN) 12. This connection may be utilized for uploading or downloading data to or from other devices, such as a personal computer, for storage efficiency and convenient access to the many software programs available for consumer and commercial use.

As the user resolves each scheduled call (either by completing the call, or by "skipping" the call if it cannot be completed at the time it is initiated), the user has the choice of deleting the entry for the call, rescheduling it for a later time (either automatically, or for after a delay specified by the user). In addition, the user may use the available memory in the personal communications device as a "dictation machine," providing commentary or reminder notes concerning the subject material of the discussion, or even serving to record the conversation itself in those communities in which it is legal to do so. When an active connection to the PDA is available, then the memory of that device may be accessed for this purpose.

Depending on the particular embodiment, the personal communications device or the PDA may be equipped with removable or non-removable high-capacity storage, to allow extended recording times or note-taking, or for maintaining other records of the conversations, such as a filing system for conversations, notes, and date-stamps of records, that may be accessed in order to review the history of contacts with a particular customer. Where it would be beneficial to do so, a database may be implemented to organize the various records. In an alternative embodiment, the personal communications device would be enabled to receive facsimile information that could be displayed on the PDA or other user interface display, or printed for hard-copy availability. Annotations, including graphical information or images may be added to these records, using special software similar to that provided for many word processing applications or desktop publishing applications; a data file transmitted over the communication link would be received, stored, and made available for inclusion in the records.

Additional features are available, by utilizing the conventional wireless wide-area telecommunications link 14, either separately or in conjunction with a wireless local area telecommunications link 16. For example, the usual cell-phone link (represented by the conventional wireless wide-area telecommunications link) could be coordinated with a link to a cordless-telephone base station (represented by the a wireless local area telecommunications link). In this case, a user might initiate a telephone call over a terrestrial link (through the cordless telephone base station) and then automatically switch to a cell phone link when the distance from the personal communications device to the cordless telephone base station becomes so great that the signal begins to deteriorate. This deterioration may be monitored by having a "ranging signal" transmitted from either the personal communications device or the cordless telephone base station; in the first case, the signal evaluation might consider factors such as time-of-flight as well as signal strength, while in the second case, signal strength alone would be used. However, other possible methods of interconnection, such as infrared wireless connections, may be employed.

Once a determination has been made that a new signal path should be sought out, the personal communications device automatically would switch to the best alternative link available. Since two-way communication links, by tradition, have been charged on a per-minute usage basis, it will be advantageous to include economic considerations of the costs of each of the various available links as part of the selection process. In this case, a connection provider would levy charges based on a per-packet fee for carrying the data over its network.

The reverse process would allow a user automatically to transfer a connection established over a cell phone link to a terrestrial link, as soon as the user reaches a location, such as the user's office or home, wherein these alternatives become available. As Internet-based telephony becomes more readily available, it is likely to become another factor in the selection process.

In order to optimize the efficient management of the various possible connection options, it may be advantageous to implement the personal communications device to monitor, on a continuous or periodic basis, the connections currently available at any point in time. In this way, switching between the various connection paths would be accomplished seamlessly, and imperceptibly, from the standpoint of the user. In addition, this would enable dynamic management of bandwidth, temporarily expanding the connection path bandwidth, or adding additional connection paths to facilitate the transmission of a large file, and later reducing the bandwidth after the file transfer has been completed.

In an alternative embodiment, a portion of the memory would be reserved, to provide "background music" for the benefit of a caller who has been placed "on-hold."

In yet another alternative embodiment, the information about the location of the personal communications device may be utilized to improve transmission reliability. For example, when the signal strength reduction is sensed as a user carrying the personal communications device enters a tunnel, a warning signal would be transmitted, so that the other party in the conversation is made aware of the impending interruption. Data packets from each end would be buffered, and once the connection again becomes available, the buffers would be emptied as the connection "catches up."

We claim:

1. A method comprising:
sequentially initiating, by a computer based calling system, a first call and a second call to a first phone number and a second phone number, respectively, in response to sequentially receiving a first command and a second command, respectively, wherein the first phone number and the second phone number are sequentially included in a stored list, wherein the second command is provided in response to a completion of the first call;
outputting a pre-recorded voice message associated with at least one of the first or second phone numbers before initiating a call to at least one of the first or second phone numbers;
receiving an indication that at least one of the first or second commands is input via a voice command or key press; and
deleting, by the computer based calling system, the first phone number and the second phone number from the stored list in response to the completion of the first call and the second call, respectively, wherein the completion of the first call or the completion of the second call includes contacting an intended recipient of a user.

2. The method of claim 1, further comprising receiving an indication that at least one of the first or second commands is input via an abbreviated command.

3. The method of claim 1, further comprising receiving an indication that at least one of the first or second commands is input via one or more key buttons of a communications device that performs the sequentially initiating and the deleting.

4. The method of claim 1, wherein the outputting the pre-recorded message includes outputting a stored voice message.

5. The method of claim 1, further comprising returning to one of the first or second phone numbers in response to the first or second call to the first or second phone number being unanswered.

6. The method of claim 5, wherein the unanswered call is placed in a queue of the stored list.

7. The method of claim 1, further comprising rescheduling a call to the first or second phone numbers in response to the first or second call being unanswered.

8. The method of claim 7, wherein the rescheduled call is placed in a predetermined time slot in the stored list.

9. The method of claim 1, further comprising forming the stored list to include phone numbers of calls that were received by a communications device and not answered.

10. The method of claim 9, wherein the forming uses a caller ID.

11. The method of claim 9, wherein forming the stored list includes forming a schedule that details when at least one of the first or second phone numbers is to be initiated.

12. An apparatus comprising:
  means for receiving at least one of a plurality of commands to initiate a call to at least one of a plurality of phone numbers included in a list, wherein each command of the plurality of commands corresponds to a different phone number of the plurality of phone numbers, wherein each of the plurality of commands after the first command is available in response to a completion of a previous call resulting from the initiating of the call to the at least one of the plurality of phone numbers included in the list, wherein the completion of the previous call includes contacting an intended recipient of a user;
  means for outputting a pre-recorded voice message associated with the at least one of the plurality of phone numbers before initiating a call to at least one of the plurality of phone numbers;
  means for receiving an indication that at least one of the plurality of commands is input via a voice command or key press;
  means for initiating the call to the at least one of the plurality of phone numbers in response to the outputting of the pre-recorded message by the outputting means; and
  means for resolving a call to the one of the phone numbers that is a result of the initiating.

13. The apparatus of claim 12, wherein the means for receiving at least one of the plurality of commands is configured to receive an abbreviated command.

14. The apparatus of claim 12, wherein the means for receiving at least one of the plurality of commands is configured to receive the voice command.

15. The apparatus of claim 12, wherein the means for receiving at least one of the plurality of commands is configured to receive input via one or more key buttons.

16. The apparatus of claim 12, wherein the means for outputting the pre-recorded message is configured to output a stored voice message.

17. The apparatus of claim 12, wherein the resolving means includes means for returning to the one of the phone numbers in response to determining that the call to the one of the telephone numbers is unanswered.

18. The apparatus of claim 17, wherein the unanswered call is placed in a queue of the list.

19. The apparatus of claim 17, wherein the returning means is configured to reschedule a call to the first of the plurality of phone numbers in response to the first of the plurality of phone numbers being unanswered.

20. An apparatus of claim 19, wherein the rescheduled call is placed in a predetermined time slot in the list.

21. The apparatus of claim 12, further comprising means for forming the list to include one or more of the plurality of phone numbers that correspond to one or more calls that were received but not answered.

22. The apparatus of claim 21, wherein the means for forming is configured to use a caller ID.

23. The apparatus of claim 21, wherein means for forming the list is configured to form a schedule that details when a call to at least one of the plurality of phone numbers is to be initiated.

24. One or more tangible non-transitory computer-readable media comprising instructions that are executable by a communications device that, in response to being executed, perform the operations comprising:
  initiating a call to a plurality of phone numbers included in a list stored by the communications device sequentially such that the initiating a call to at least two of the plurality of phone numbers is initiated by respective commands, sequentially, wherein the respective commands are available in response to a completion of a previous call resulting from initiating a call to at least one of the plurality of phone numbers included in the list, wherein the completion of the previous call includes contacting an intended recipient of a user;
  outputting of a pre-recorded voice message associated with a particular one of the plurality of phone numbers before the initiating the call;
  receiving an indication that at least one of the respective commands is input via a voice command or key press; and
  returning to one or more of the plurality of phone numbers that are unanswered.

25. The one or more tangible computer-readable media of claim 24, wherein at least one of a plurality of sequential commands is input via an abbreviated command.

26. The one or more tangible computer readable media of claim 24, wherein at least one of a plurality of sequential commands is input via the voice command.

27. The one or more tangible computer readable media of claim 24, wherein at least one of a plurality of sequential commands is input via one or more key buttons of the communications device.

28. The one or more tangible computer readable media of claim 24, wherein the instructions are executable by the communications device to output a stored voice message.

29. The one or more tangible computer-readable media of claim 24, wherein the unanswered call is placed in a queue of the list.

30. The one or more tangible computer-readable media of claim 24, wherein the returning includes rescheduling a call to the unanswered one or more of the plurality of phone numbers.

31. The one or more tangible computer-readable media of claim 24, wherein the instructions are executable to form the list to include phone numbers of calls that were received by the communications device and not answered.

32. The one or more tangible computer readable media of claim 31, wherein the instructions are executable to form the list using a caller ID.

33. The one or more tangible computer-readable media of claim 31, wherein the instructions are executable to form the list as a schedule that details when a call to at least one said phone number is to be initiated.

34. A communications device comprising:
  a processor and memory having instructions that are executable, wherein the instructions cause the communications device to perform operations including:
    forming a list having a plurality of phone numbers of unanswered calls of the communications device;
    sequentially initiating a call to the plurality of phone numbers included in the list, wherein the initiating of a call to at least two of the plurality of phone numbers is initiated by respective commands, sequentially, wherein the respective commands are available in response to a completion of a previous call resulting from initiating a call to at least one of the plurality of phone numbers included in the list, wherein the completion of the previous call includes contacting an intended recipient of a user;

outputting of a pre-recorded voice message associated with a particular one of the plurality of phone numbers before the initiating the call; and receiving an indication that at least one of the respective commands is input via a voice command or key press.

35. The communications device of claim 34, wherein at least one of a plurality of sequential commands is input via an abbreviated command.

36. The communications device of claim 34, wherein at least one of a plurality of sequential commands is input via the voice command.

37. The communications device of claim 34, wherein at least one of a plurality of sequential commands is input via one or more key buttons of the communications device.

38. The communications device of claim 34, wherein the instructions are executable on the processor to output the pre-recorded message as a stored voice message.

39. The communications device of claim 34, further comprising instructions executable on the processor to reschedule the initiation of the call to a particular said telephone number in response to determining that a call directed to the particular said phone number is unanswered.

40. The communications device of claim 39, wherein the instructions to reschedule the initiation of the call are configured to perform the initiation of the call without manually entering the particular said phone number.

41. The communications device of claim 34, further comprising instructions that are executable to form the list using caller IDs to include phone numbers of calls that were received by the communications device and were not answered.

42. The communications device of claim 41, wherein the instructions to form the list are configured to form a schedule that details when a call to at least one of the plurality of phone numbers is to be initiated.

43. A method comprising:
   initiating, by a computer based calling system, a first call by initiating the first call to a first phone number in response to receiving a first command, wherein the first phone number is selected from a list of phone numbers comprising the first phone number and a second phone number, wherein the first phone number and the second phone number are sequentially included in the list;
   deleting, by the computer based calling system, the first phone number from the list in response to completing the initiating of the first call to the first phone number;
   initiating, by the computer based calling system, a second call after completing the initiating of the first call in response to receiving a second command;
   deleting, by the computer based calling system, the second phone number from the list in response to completing the initiating of the second call to the second phone number, wherein the completion of the first call or a completion of the second call includes contacting an intended recipient of a user;
   outputting a pre-recorded voice message associated with at least one of the first or second phone numbers before initiating a call to the respective one of the first or second phone numbers; and
   receiving an indication that at least one of the first command or the second command is input via a voice command or one or more key buttons of the communications device.

44. The method of claim 43, wherein the first command is the same as the second command.

45. The method of claim 43, wherein the first command is different from the second command.

46. The method of claim 43, further comprising receiving an indication that at least one of the first command or the second command is input via an abbreviated command.

47. The method of claim 43, wherein the outputting the pre-recorded message includes outputting a stored voice message.

48. The method of claim 43, further comprising returning to the first or second phone number in response to a call to the respective first or second phone number not being answered.

49. The method of claim 43, further comprising rescheduling a call to the first or second phone number in response to the respective first or second call not being answered.

50. The method of claim 49, wherein the rescheduled call is placed in a predetermined time slot in the stored list.

51. The method of claim 43, further comprising forming the sequential list to include phone numbers of calls that were received by the communications device and not answered.

52. The method of claim 51, wherein the forming uses a caller ID.

53. The method of claim 51, wherein forming the sequential list includes forming a schedule that details when a call to at least one of the first or second phone numbers is to be initiated.

* * * * *